Patented Nov. 6, 1951

2,573,878

UNITED STATES PATENT OFFICE 2,573,878

CORROSION PREVENTIVE COMPOSITIONS

Knapel F. Schiermeier and Herbert A. Poitz, Alton, Ill., assignors to Shell Development Company, San Francisco, Calif., a corporation of Delaware No Drawing. Application April 26, 1948, Serial No. 23,396

13 Claims. (Cl. 106—14)

This invention relates to compositions suitable for inhibiting or even preventing the rusting and corrosion of metal surfaces. More particularly, the present invention pertains to novel compositions of matter which on application to metal surfaces form protective films which are impervious to moisture, corrosive fluids and the like, thereby protecting said metal surface for relatively long periods of time.

It is well known that moisture, corrosive fluids, gases, and the like, readily attack ferrous and non-ferrous metals causing corrosion, rusting, pitting, and other damage to such surfaces. Also, aqueous solutions in contact with metallic surfaces readily attack it and cause corrosion and rusting. Under certain conditions, the problem of corrosion is exceedingly serious because once started it becomes progressively accelerated. Thus, oils containing small amounts of water cause corrosion of metals in contact therewith. This is due to the fact that oils, and particularly liquid petroleum hydrocarbons, are very good solubilizers of oxygen, and any moisture present therein becomes surrounded by an almost inexhaustible store of oxygen. Moisture under such conditions is inhibited from evaporating and since the rate of transfer of oxygen from hydrocarbons, such as mineral oil or gasoline, to water is limited, ideal conditions for rusting and corrosion are set up. The presence of electrolytes, and formation of corrosive decomposition products in oils, and the like, also greatly increase the rate of corrosivity.

Under conditions where, in addition to those enumerated, elevated temperature is encountered, corrosion activity is greatly accelerated. Thus, corrosion is greatly accelerated when moisture, salt spray and other contaminants or acidic composition products or corrosive gases, come in contact with hot metal bodies, particularly under conditions normally developed in machinery and industrial equipment during its operation.

Corrosion of metallic surfaces can attain such an aggravated stage as to cause great fatigue stresses to be set up, which ultimately may result in cracking of the metal.

The problem is particularly serious when metallic parts, machines, such as aircraft engines, and the like, are transported over bodies of salt water over long periods of time under humid and high-temperature conditions. Unless the metal surfaces are protected with a coating composition which is impervious to the active corrosion producing agents, serious and damaging corrosion sets in.

Metal articles which have been pickled, quenched and otherwise treated and thereafter stored away must also be protected against corrosion until ready for use.

Countless materials and compositions have been tried for protecting metallic surfaces against corrosion by coating said surfaces with a non-reactive, corrosion-preventive composition, which can be easily removed when desired. Thus, metal surfaces have been coated or treated with greases, fatty compositions, waxes, organic compounds, e. g. organic acids, amines, inorganic compounds and the like in order to protect them against corrosion. In almost all cases where no chemical reaction occurred between the surface treated and the corrosion or rust inhibitor very little benefit was derived. This is due to the fact that non-chemical reactive inhibitors are incapable of penetrating the surface being protected and are incapable of displacing the contaminant therefrom. In cases where such inhibitors are capable of forming protective coatings on surfaces they are easily displaced by moisture or rupture readily.

Although chemically reactive protective materials are more durable a serious drawback to them is that they change the surface characteristic of the metal which under certain conditions is most undesirable. A coating composition which is non-reactive with contacting surfaces, but which resists pentration by corrosive materials and adheres tenaciously to a surface for intervals desired is generally preferable. This is due to the fact that on removal of the protective coating the metal is substantially in the same state as when originally preserved, so that thereafter it may be treated in any desired manner.

It is an object of this invention to protect metal surfaces in contact with corrosive contaminants by coating said surfaces with a composition which has no detrimental effect upon the metal surface thus coated. It is still another object of this invention to protect metallic surfaces with coating compositions which resist rupture even at elevated temperatures and which can be readily removed when desired. Other objects will be apparent from the following description.

It has now been discovered that various metal surfaces which are conducive to corrosive influences can be protected simply and effectively by coating with a composition of matter comprising a bitumen base having admixed therewith: (1) a substantial amount of light hydrocarbon boiling below the lubricating oil range, (2) an oxidized waxy hydrocarbon substantially free from aromatics, and (3) a minor amount, but which is sufficient to inhibit corrosion, of a particular type or types of organic compounds having corrosion inhibiting properties when admixed with the other ingredients of the compositions of this invention.

The bitumen which comprises the base material of the coating compositions of this invention may be an asphaltic bitumen obtained by various means during the refinement of crude oils. The asphaltic bitumen specifically may be obtained as a residue from crude oil during the distillation process, or it may be obtained from acid tars in the treatment of lubricating oils with sulfuric acid. It may also be obtained during the deasphaltizing treatment of lubricating oils with solvents.

The production of asphaltic bitumen by distillation from crude oil or topped crude may be carried out under atmospheric pressure or under reduced pressure. In such cases, the distillation of the crude oil may be continued until the residue in the still obtains the desired penetration. Thus, a crude oil heated to a temperature of from 100° to 150° F. is fed into an evaporator where vapors are flashed off and the residue is stripped with the assistance of superheated steam at from 530° to 580° F. The residue which is the asphaltic bitumen is drawn off from the evaporator through heat exchangers where it is cooled to from 320° to 360° F., and thereafter stored.

The recovery of asphaltic bitumen from acid sludges may be obtained by mixing the acid sludge with water, agitating with air and live steam, and thereafter allowing the mixture to settle into three layers. The dilute acid layer settles to the bottom and an oily layer rises to the top, while the middle layer consists of acid tars. The top and bottom layers are removed and the tar acid is further washed with water and agitated with steam and air until all the acid has been removed from the tar. The tar is then heated with superheated steam until the residual pitch has the desired penetration or softening point. If desired, the tars from the middle layer may be admixed with slaked lime to neutralize the acids and thereafter the asphaltic bitumen recovered.

Asphaltic bitumen can be removed from residual oils by the addition of low-boiling hydrocarbons which cause the precipitation of asphaltic materials as a lower layer containing a small amount of the solvent. Thus, an oil may be dispersed in butane and heated under pressure. The mixture may then be treated with a solvent such as propane or ethane until the asphaltic material is precipitated. The quality of the asphaltic bitumen thus produced depends upon the nature of the residual oil, the solvent used and other factors.

Asphaltic bitumens obtained by any of the above processes as well as by any other suitable means and source may be used as the base component of the coating composition of this invention. The preferred asphaltic bitumens are those which have softening points of between about 110 and 250 and preferably between 175 to 200. The asphalts may be blown if desired.

Asphalts particularly suited as components of compositions of this invention can be exemplified by having the following properties:

|  |  | Softening Point Limits |
| --- | --- | --- |
| Melting Point (Ring and Ball), °F | [1] 175 | 175 to Approx. 182 (in water bath). |
| Penetration at 77° F | 15 |  |
| Ductility at 77° F. (5 cm. rate) | 3 |  |
| Insoluble in 88 Bé. Naphtha, Per Cent | 32 |  |
| Soluble in CCl₄, Per Cent | 99.8 |  |
| Sp. Gr. at 77° | 1.021 |  |

[1] Water bath.

The asphaltic bitumen generally comprises anywhere from 35% to 45% of the coating base, and preferably from 40% to 45%.

To the above asphaltic bitumen is added between about 5% and 20%, and preferably from about 15% to about 20%, of an oxidized waxy hydrocarbon which is substantially non-aromatic. The waxy hydrocarbons which are oxidized and used as a component of compositions of this invention, may be derived from petroleum fractions such as petroleum distillates or residues, or the waxy hydrocarbons may be produced synthetically by polymerization of olefinic materials by Fischer-Tropsch process or by dehydration of long-chain aliphatic alcohols.

Waxy hydrocarbons may be recovered from suitable petroleum fractions such as Pennsylvania crude, East Texas crudes, Mid-Continent crudes, and the like, by de-asphaltizing the hydrocarbon, and thereafter removing the wax from the asphalt-free hydrocarbon fraction by any known suitable means. The preferred waxy hydrocarbons such as Mid-Continent Short Residues are residues of topped crudes. The asphalt may be separated from the oil either by distillation or solvent extraction and used as a component of compositions of this invention. In the solvent process a solvent is selected in which the oil is relatively soluble but in which the asphaltic materials are relatively insoluble. Among such solvents are the light liquid hydrocarbons such as ethane, propane, butane, as well as naphtha and gasoline. Oils treated with such solvents extract the oil and wax leaving behind the asphaltic materials as residue which can be utilized as a component of compositions of this invention. The wax-oil mixture may be removed from the asphalt-free solution by chilling the solution, and then separating the precipitated wax by settling, filtering or centrifuging. Waxy materials thus produced are known in the art as slop waxes, petrolatum stock, slack waxes, scale waxes, paraffin waxes, plate, malcrystalline and needle waxes, microcrystalline waxes and the like. These waxes are differentiated from each other by the degree of de-oiling to which they are subjected and all of them may be used provided they are substantially free from aromatics.

Dewaxing or separation of the above waxy constituents from the oil may be accomplished by selective solvent treatment using as the diluents liquefied normally gaseous hydrocarbons such as propane, butane, and other corresponding olefins and/or their mixtures as well as oxygen-containing liquid organic substances such as alcohols, ethers, esters, ketones, aldehydes, acids and/or their mixtures. These may include methyl, ethyl, propyl, butyl, amyl alcohols; methyl or methylethyl ether; acetone; diethyl, dimethyl, methylethyl, methylisobutyl ketones, and the like. Chlorinated hydrocarbons such as carbon tetrachloride or trichloroethylene and mixtures of chlorinated and non-chlorinated hydrocarbons as mentioned above also may be used.

The first step in obtaining waxy constituents from petroleum crudes, for example, such as Mid-Continent crude is to treat said crude with about six volumes of liquid propane so as to remove the asphalt. The propane from the propane-oil solution is vaporized so that the ratio of propane to oil is reduced approximately 2 to 1. The solution is then chilled to about −40° F. and lower causing separation of the wax from the oil. The wax can be removed by filtration and the propane separated from the de-asphalted and dewaxed oil and waxy material by distillation.

Waxy materials can also be recovered from distillate or residuum lube oil fractions and these wax fractions can be split still further into special wax cuts having desired characteristics by use of selective solvents. This is based on a difference in solubility of different waxy fractions in a given solvent. Thus, when using a methylethyl ketone type solvent the aromatic constituents can be removed by successively cooling the mixture down to between about −40° to −76° F. so as to remove the aromatics which become substantially soluble in the solvent as the temperature is lowered while the straight-chain waxes and isoparaffins become substantially insoluble in the solvent. The straight-chain waxes can be separated from the isoparaffins by extraction and fractional crystallization. Depending upon the distillate cut used waxes of from 12 to about 36 carbon atoms and higher can be obtained.

The above type of waxy hydrocarbons may be admixed with synthetic waxes produced by polymerization of olefines under pressure or by dehydrating long-chain fatty alcohols such as octadecyl alcohol and the like. Admixed with non-aromatic waxy hydrocarbon may be minor amounts of waxy materials obtained from non-hydrocarbon services such as marine animal waxes, vegetable waxes, animal waxes and the like, and specifically may be illustrated by spermaceti Japan wax, carnauba wax, montan wax, sugar cane wax, cotton wax, etc. and the mixture oxidized.

The waxy material and their mixtures may be oxidized by any suitable means such as blowing with an oxidizing gas such as air, air enriched with oxygen, pure oxygen, oxygen diluted with inert gas and the like. Substantially the waxy material may be oxidized by such means as are disclosed in the following U. S. patents: 1,863,004, 2,043,923, 2,156,226, 2,186,910 and 2,216,222. If desired minor amounts not exceeding about one-third, and preferably less, of non-oxidized waxy materials may be admixed with the oxidized products.

Prior to or during the addition of corrosion inhibitors of this invention to the mixture of asphalt and of the oxidized wax, a light liquid diluent having a boiling point range below that of lubricating oil may be added to aid in dispersing the corrosion inhibitor in the base and aid in applying the composition to surfaces requiring protection against corrosion, rusting and the like. Diluents which may be used are kerosene, mineral seal oil, gas oil, fuel oil, various petroleum naphtha cuts, mineral spirits, kerosene $SO_2$ extract, aromatic solvents, petroleum ethers, liquid paraffinic hydrocarbons such as octane, isooctane, dodecane; cycloparaffins, e. g. cyclohexane, methyl cyclohexane, etc. The diluent is generally not used in amounts exceeding 40% and preferably is kept in the range of between about 30% and about 40%.

Organic materials which are compatible with compositions of this invention and which aid in inhibiting rusting and corrosion of surfaces coated with compositions of this invention are metal salts of organic cyclic acid and mixtures of said salts with salts of organic sulfonic acids. The salts of organic cyclic acids or mixtures of said salts with organic sulfonates are used in minor amounts generally not exceeding 5% and preferably in amounts of between about 1% and about 3%. The preferred salts are the alkali, alkaline earth and heavy metal salts of the organic cyclic acids. The cation portion of said salts, however, may be Na, K, Ce, Ca, Ba, Sr, Mg, Al, Zn, Pb, Sn, Ge, Zr, Cr, Cd, Co, Fe, Mo, Ni, Va, Bi and the like. The anion portion of the salt of these metals is an organic cyclic acid and may be represented by the formula

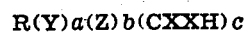

$$R(Y)a(Z)b(CXXH)c$$

wherein R is a cyclic radical; the X's may be O, S, Se and/or Te; the acid radical (CXXH) being limited directly or indirectly to R; Y is a polar group; Z is an organic radical from the group consisting of alkyl, alkylene, alkylaryl, arylalkyl, alkoxy, aroxyl, aryl radical and the like; $a$ and $b$ may be zero or an integer of 1 or 2, and $c$ is an integer of 1 or 2. The substituent group represented by Y in the formula may be hydroxy, amine, nitro, nitroso, halogen, sulfo, mercapto and the like. The polar group or groups may be attached directly or indirectly to the R radical.

Specifically cyclic acids may include: naphthenic acid (derived from petroleum hydrocarbon), phenyl naphthenic acid, hydroxy-phenyl naphthenic acids, benzyl naphthenic acids, benzoyl naphthenic acids, naphthyl naphthenic acids, xenyl naphthenic acids, phenyl-vinaconic acid, phenyl-caronic acid, truxillic acid, phenyl-norpinic acid, phenyl-finic acid, phenyl-camphoric acid, phenyl camphenic acid, phenyl 2,3,4 trimethyl cyclopentane-3 carboxylic acid, phenyl hexahydrobenzoic acids, hydrophenyl hexahydrobenzoic acid, benzyl hexahydrobenzoic acid, phenyl hexahydrophthalic acid, phenyl quinic acid, hexahydrobenzoic acid, tetrahydrophthalic acid, hexahydrophthalic acid, tetrahydrotoluic acid, alkyl hexahydrophthalic acid, alkylene cyclohexadiene carboxylic acid, cyclohexane carboxylic acid, cyclohexyl acetic acid, cyclohexylbutyric acid, cyclohexylcaproic acid, cyclohexylpropionic acid, cyclohexylvaleric acid, fencholic acid, cholic acid, abietic acid, etc.

Some specific salts of organic cyclic acids are listed below in which any of the cations listed may be combined with any of the anion parts listed to form the salts:

| Cation | Anion |
|---|---|
| Sodium | petroleum naphthenic acid |
| Calcium | phenyl naphthenic acid |
| Barium | hydrophenyl naphthenic acid |
| Strontium | naphthyl naphthenic acid |
| Lead | phenylfinic acid |
| Tin | phenyl hexahydrobenzoic acid |
| Aluminum | phenyl hexahydrophthalic acid |
| Zinc | cyclo hexadiene carboxylic acid |
| Cadmium | cyclo hexylcaproic acid |
| Cobalt | abietic acid |
| Germanium | |
| Zirconium | |
| Chromium | |
| Magnesium | |

The salts of organic cyclic acids may be replaced in whole or in part by salts of organic sulfonic acids. Sulfonates may be obtained by sulfonating various petroleum hydrocarbon fractions with sulfuric acid, oleum, chlorosulfonic acid, sulfur trioxide and their mixtures. Petroleum hydrocarbons may be treated with sulfur dioxide and a halogen and the resultant product hydrolyzed and neutralized to produce sulfonated hydrocarbons. The petroleum hydrocarbons may be aliphatic, cyclic and/or aromatic and specifically may be gas oil, kerosene, light oil, turbine oil, mineral lubricating oil, heavy oil, petroleum waxes, petrolatum and their mixtures.

For example, a turbine oil having a Saybolt Universal viscosity at 100° F. of from about 400 to 540 seconds may be treated with fuming sulfuric acid, preferably in small increments. After a calculated amount of sulfuric acid has been added to the oil, the sludge which forms is removed and the acid-treated oil containing dissolved oil-soluble sulfuric acid is neutralized with a aqueous solution of sodium hydroxide. The aqueous alkali solution is removed from the mixture and the sodium salts of petroleum sulfonic acid extracted with alcohol, the alcohol layer containing the sulfonates can be removed by distillation or by any other suitable means.

Modifications to the above procedure can be made by removing acid sludge after the entire required amount of acid has been added. Also the sulfonic acid can be removed before neutralization rather than after as indicated above. If this is done, it is preferable to give the acid-treated oil a clay treatment so as to remove inorganic esters of sulfuric acid and other impurities so as to prevent formation of inorganic salts. Clays which are particularly suitable are highly adsorbent clays such as Attapulgus clay, Floridin, bentonite, bauxite, fuller's earth, etc. Still another modification in preparing pure oil-soluble sulfonates is to add to the sludge-free, acid-treated oil a solvent such as benzol, carbon tetrachloride and the like and to neutralize said mixture with a caustic solution. The spent caustic solution is removed. The solvent is distilled off, leaving a substantially pure sulfonate in oil mixture. The product can be air blown and dehydrated to remove impurities. Instead of sulfonating a mineral oil alone a small amount of waxy material may be added to obtain a more improved sulfonate. The sulfonic acids may be formed by acidifying the neutralized sulfonate or a particular desired salt of a sulfonic acid may be obtained by double decomposition. Also petroleum sulfonates may be produced by the processes disclosed in the following U. S. patents: 2,388,677; 2,395,713; 2,413,199; 2,414,773; 2,416,397 and, if desired, the petroleum sulfonates may be purified by means disclosed in U. S. Patents 2,236,933; 2,334,532; 2,357,866; 2,368,452; 2,406,763.

Instead of using petroleum hydrocarbons, mixtures thereof with other materials may be sulfonated such as olefins, olefin polymers, isoalkanes of high molecular weight, hydrocarbon rubber, cycloaliphatic hydrocarbons, natural fats, fatty oils, waxes, their fractions and derivatives. Specifically the following fatty materials may be sulfonated or admixed with petroleum fractions and then sulfonated:

| | |
|---|---|
| castor oil | wool fat |
| cocoanut oil | Japan wax |
| corn oil | olefin waxes |
| cottonseed oil | paraffin waxes |
| horse fat | wax tailings |
| lard oil | petrolatum |
| mutton tallow | vegetable and animal phosphatidic materials |
| beef tallow | |
| neat's foot oil | montan wax |
| palm oil | carnauba wax |
| peanut oil | beeswax |
| rapeseed oil | spermaceti |
| soya bean oil | castor oil distillate |
| sperm oil | ozokerite |
| whale oil | tall oil |
| | and the like |

In addition to these oils and fats, their fatty acids, glycerides and the like can be used. Also free fatty acids of high molecular weight and having at least 12 carbon atoms, their esters and amides can be sulfonates and used as an additive of this invention particularly when in combination with an oil-soluble petroleum sulfonate.

The sulfonic acid compounds which are particularly preferred are the mahogany acids obtained from lubricating oils, or of various alicyclic or aliphatic sulfonic acids, naphthalene sulfonic acids; sulfonic acids of various aromatic hydrocarbons such as alkylated benzenes, diphenyls, xylenes, diphenyl methanes, tetralines, naphthalenes, anthracenes, phenanthrenes; alkyl phenolic compounds; halo aromatic compounds, e. g. chlorinated diphenyl oxides; naphthylamines, diphenyl sulfides, diphenyl amines; alkylated pyridines, quinolines, isoquinolenes, pyrral, pyrolidines, piperidines, thiophenes, etc. Also organic compounds containing polysulfonic acid groups can be used and the above compounds may contain substituent groups such as halogen, hydroxy, hydrosulfide, ether, amino, imino, sulfide, carboxyl ester, etc.

The polyvalent metal salts such as Ca, Ba, Sr or Mg of benzene sulfonic acid, toluene sulfonic acid, tri-isopropyl naphthalene sulfonic acid, alkyl phenol sulfide-sulfonic acids, e. g. triisobutyl cresol-sulfonic acid; oil-soluble petroleum sulfonic acids obtained from turbine oil, lubricating oil, petrolatum and mixtures thereof are particularly preferred.

A general formula of a base composition of this invention may contain the following components:

| | Components | Per cent by weight |
|---|---|---|
| 1 | Asphaltic bitumen | 35–45. |
| 2 | Oxidized waxy hydrocarbon | 5–20. |
| 3 | Light hydrocarbon boiling below the lubricating oil range | up to 40. |
| 4 | Salt of an organic cyclic acid | up to 5. |
| 5 | Salt of an organic acid | not to exceed ½ of the salt of organic cyclic acid used. |

This base is diluted with a suitable amount of a light liquid hydrocarbon to facilitate application of the composition to surfaces which are to be protected. Compositions of this invention may be applied by any suitable means such as spraying, brushing, swabbing, dipping and the like.

Compositions of this invention can be made by the following procedure: A desired amount of melted asphalt and oxidized waxy hydrocarbon are admixed and heated to about 350° F. under agitation. The mixture is then slightly cooled and the light hydrocarbon diluent is slowly added with continuous agitation. This mixture is then cooled to about 150° F., a desired salt, such as lead naphthenate added, and the composition cooled to room temperature with agitation. A specific example of a rust inhibiting composition (henceforth designated as Composition A) of this invention comprises:

| | Per cent |
|---|---|
| LVI asphalt (S. P. 175° F.) | 40 |
| Oxidized Mid-Continent short residue | 20 |
| Lead naphthenate | 5 |
| Mineral spirits | 35 |

Composition B:                                    Per cent
   LVI asphalt (S. P. 175° F.) _____ 40
   Oxidized Mid-Continent short residue____ 20
   Pb naphthenate admixed with Ca and/or
     Ba petroleum sulfonate_____ 5
   Mineral spirits_____ 35

The following table further illustrates suitable coating compositions for preventing rusting; these compositions may be prepared in a manner disclosed above and are illustrated by the following examples:

| Components [1] | 1 | 2 | 3 | 4 | 5 | 6 | 7 | 8 | 9 | 10 |
|---|---|---|---|---|---|---|---|---|---|---|
| Asphaltic material | x | x | x | x | x | x | x | x | x | --- |
| Oxidized Waxy Residue | --- | x | --- | --- | --- | --- | x | x | --- | --- |
| Oxidized paraffin wax | --- | --- | --- | --- | x | x | --- | --- | --- | --- |
| Oxidized slop wax | --- | --- | --- | --- | --- | --- | --- | --- | --- | x |
| Oxidized short residue petroleum wax | --- | --- | --- | x | x | --- | --- | --- | --- | --- |
| Oxidized mixture of short residue petroleum wax and spermaceti | --- | --- | --- | --- | --- | --- | --- | --- | x | --- |
| Lead naphthenate | x | x | x | --- | --- | x | --- | x | --- | --- |
| Tin naphthenate | --- | --- | --- | --- | x | --- | --- | --- | --- | --- |
| Ca naphthenate | --- | --- | --- | x | --- | --- | --- | --- | --- | --- |
| Pb abietate | --- | --- | --- | --- | --- | --- | --- | --- | --- | x |
| Ba naphthenate | --- | --- | --- | --- | --- | --- | --- | --- | --- | --- |
| Tin abietate | --- | --- | --- | --- | --- | --- | x | --- | x | --- |
| Ca petroleum sulfonate | --- | x | x | --- | --- | --- | --- | x | --- | --- |
| Ba petroleum sulfonate | --- | --- | --- | x | x | --- | --- | x | --- | --- |
| Ca triisopropyl naphthene sulfonate | --- | --- | --- | --- | --- | --- | --- | --- | --- | x |
| Ca diwax benzene disulfonate | --- | --- | --- | --- | --- | --- | --- | --- | x | --- |

[1] All of the above compositions are diluted with a light liquid hydrocarbon such as mineral spirits, kerosene, etc., to obtain the desired consistency in the final product.

In order to determine the protective properties compositions of this invention possess, various metals were coated with compositions of this invention and subjected to the following tests:

*Humidity cabinet test*

In this test sand-blasted or polished steel panels which have been coated with a product of this invention were exposed continuously in an atmosphere of 100% relative humidity at a constant temperature (100 or 120° F.). A slow flow of saturated air through the cabinet is maintained and moisture condenses on the panels. The average time exposure until rusting occurs on the faces of the panels is taken as the life of the coating.

*Salt Spray test*

In this test polished steel panels which have been coated with a composition of this invention are exposed continuously at a constant temperature (95° or 100° F.) to a salt mist or fog which is produced by the atomization of a 20% sodium chloride solution. The average time until rusting occurs on the faces of the panels is taken as the life of the coating.

*Ultraviolet weathering unit test*

In this test polished or sand-blasted steel panels coated with a desired product to be evaluated are continuously exposed to intense light from a carbon arc and are intermittenly wetted by a fine water spray. The average time until rusting occurs on the faces of the panels is taken as the life of the coating.

Steel panels coated with Composition A and B are noted below and compared with a commercial product X for rust inhibiting properties as determined by the above described tests. The results are tabulated below:

| Test | Composition A | Composition B | Composition X |
|---|---|---|---|
| Salt spray test 20%, 10 days | no rust | no rust | rust |
| Ultraviolet test, 50 days | no rust | no rust | rust |

Compositions of this invention may be modified by addition thereto of salicylates, oleates, stearates, sulfated oils, e. g. paramine oleate, cyclohexylamine oleate or ricinoleate; salts of inorganic acids, e. g. metal phosphates; organic esters, e. g. dilorol phosphate, dilauryl phosphite; polycarboxylic acids, e. g. alkyl succinic acid; inorganic compounds, e. g. sodium and lithium nitrite, sodium chromate, etc.

Compositions of this invention may if desired be very easily removed by flushing, wiping or by any other suitable means.

Many modifications and variations of this invention as hereinbefore set forth may be made without departing from the spirit and scope thereof and therefore only such limitation should be imposed as indicated in the appended claims.

We claim as our invention:

1. A rust inhibiting concentrate consisting essentially of the following constituents in the following proportions:

Percent by weight
   LVI asphalt (175° F. S. P.) _____ 40
   Oxidized waxy short residue_____ 20
   Pb naphthenate_____ 5
   Mineral spirits_____ 35

2. A rust inhibiting concentrate consisting essentially of the following constituents in the following proportions:

Percent by weight
   LVI asphalt (175° F. S. P.) _____ 40
   Oxidized waxy short residue_____ 20
   Pb naphthenate admixed with alkaline earth
     metal salts from the group consisting of
     Ca and Ba petroleum sulfonate_____ 5
   Mineral spirits_____ 35

3. A composition of matter adapted for use as a rust inhibitor consisting essentially of a mixture of from about 35% to 45% of an asphaltic bitumen, from about 5% to 20% of an oxidized substantially non-aromatic petroleum oil-wax mixture and from about 1% to 5% of a metal salt of an organic cyclic acid, said mixture being diluted with a light liquid hydrocarbon boiling below the lubricating oil range.

4. A composition of matter adapted for use as a rust inhibitor consisting essentially of a mixture of from about 35% to 45% of an asphaltic bitumen, from about 5% to 20% of an oxidized substantially non-aromatic petroleum oil-wax mixture and from about 1% to 5% of a metal salt of an organic sulfonic acid, said mixture being diluted with a light liquid hydrocarbon boiling below the lubricating oil range.

5. A composition of matter adapted for use as a rust inhibitor consisting essentially of a mixture of from about 35% to 45% of an asphaltic bitumen, from about 5% to 20% of an oxidized substantially non-aromatic petroleum oil-wax mixture and from about 1% to 5% of a metal salt of organic acids from the group consisting of organic cyclic acid and organic sulfonic acid, said mixture being diluted with a light liquid hydrocarbon boiling below the lubricating oil range.

6. A composition of matter adapted for use as a rust inhibitor consisting essentially of a mixture of from about 35% to 45% of an asphaltic bitumen, from about 5% to 20% of an oxidized petroleum wax, and from about 1% to 5% of a mixture of metal salts of organic acids of organic cyclic acid and organic sulfonic acid, the metal sulfonate being present in an amount not exceeding ⅓ of the total mixture of the metal salts, the mixture being diluted with a light liquid hydrocarbon boiling below the lubricating oil range.

7. A composition of matter adapted for use as a rust inhibitor consisting essentially of a mixture of from about 35% to 45% of an asphaltic bitumen, from about 5% to 20% of an oxidized non-aromatic petroleum wax and from about 1% to 5% of a slat from the group consisting of alkaline earth and heavy metal of organic acids from the group consisting of organic cyclic acid and organic sulfonic acid, said mixture being diluted with mineral spirits.

8. A composition of matter adapted for use as a rust inhibitor consisting essentially of a mixture of from about 35% to 45% of an asphaltic bitumen, from about 5% to 20% of an oxidized non-aromatic slop wax and from about 1% to 5% of a salt from the group consisting of alkaline earth and heavy metal of organic acids from the group consisting of organic cyclic acid and organic sulfonic acid, said mixture being diluted with mineral spirits.

9. A composition of matter adapted for use as a rust inhibitor consisting essentially of a mixture of from about 35% to 45% of an asphaltic bitumen, from about 5% to 20% of an oxidized non-aromatic petrolatum and from about 1% to 5% of a salt from the group consisting of alkaline earth and heavy metal of organic acids from the group consisting of organic cyclic acid and organic sulfonic acid, said mixture being diluted with mineral spirits.

10. A composition of matter adapted for use as a rust inhibitor consisting essentially of a mixture of from about 35% to 45% of an asphaltic bitumen, from about 5% to 20% of an oxidized non-aromatic petroleum wax and from about 1% to 5% of a salt from the group consisting of alkaline earth and heavy metal of organic acids from the group consisting of organic cyclic acid and organic sulfonic acid, said mixture being diluted with aromatic solvent.

11. A composition of matter adapted for use as a rust inhibitor consisting essentially of a mixture of from about 35% to 45% of an asphaltic bitumen, from about 5% to 20% of an oxidized non-aromatic slop wax and from about 1% to 5% of a salt from the group consisting of alkaline earth and heavy metal of organic acids from the group consisting of organic cyclic acid and organic sulfonic acid, said mixture being diluted with aromatic solvent.

12. A composition of matter adapted for use as a rust inhibitor consisting essentially of a mixture of from about 35% to 45% of an asphaltic bitumen, from about 5% to 20% of an oxidized non-aromatic petrolatum and from about 1% to 5% of a salt from the group consisting of alkaline earth and heavy metal of organic acids from the group consisting of organic cyclic acid and organic sulfonic acid, said mixture being diluted with aromatic solvent.

13. A rust inhibiting concentrate consisting essentially of the following constituents in the following proportions:

| | Per cent by weight |
|---|---|
| (1) Asphaltic bitumen | 35–45 |
| (2) Oxidized waxy hydrocarbon | 5–20 |
| (3) Mixture of organic salts, the acid portion of which is organic cyclic acid and organic sulfonic acid, the salts of the latter acid being present in an amount not exceeding ⅓ of the total salt mixture | 1–5 |
| (4) Light hydrocarbon boiling below the lubricating oil range | 30–59 |

KNAPEL F. SCHIERMEIER.
HERBERT A. POITZ.

REFERENCES CITED

The following references are of record in the file of this patent:

UNITED STATES PATENTS

| Number | Name | Date |
|---|---|---|
| 2,124,446 | Detwiler | July 10, 1936 |
| 2,184,952 | Zimmer et al. | Dec. 26, 1939 |
| 2,348,715 | Adams et al. | May 16, 1944 |
| 2,383,715 | Adams et al. | Aug. 21, 1945 |
| 2,415,353 | Johnston | Feb. 4, 1947 |

FOREIGN PATENTS

| Number | Country | Date |
|---|---|---|
| 310,640 | Great Britain | May 2, 1929 |
| 397,267 | Great Britain | Aug. 24, 1933 |